United States Patent [19]

Curtin

[11] Patent Number: 4,730,898

[45] Date of Patent: Mar. 15, 1988

[54] STEREOSCOPIC VIEWER OF THE LORGNETTE TYPE

[75] Inventor: James J. Curtin, Clearwater, Fla.

[73] Assignee: RCI Group, Inc., Clearwater, Fla.

[21] Appl. No.: 925,550

[22] Filed: Oct. 31, 1986

[51] Int. Cl.[4] .............................................. G02B 27/22
[52] U.S. Cl. ..................................... 350/133; 350/143
[58] Field of Search ............... 350/130, 139, 142, 143, 350/133, 146; 351/44, 47, 56, 57, 68, 107, 116, 119, 124, 126, 201, 202

[56] References Cited

U.S. PATENT DOCUMENTS 760,433 5/1904 Dolph .................................. 350/143

Primary Examiner—John K. Corbin
Assistant Examiner—Ronald M. Kachmarik
Attorney, Agent, or Firm—Ronald E. Smith

[57] ABSTRACT

A stereoscopic viewing device of the lorgnette type. The device may be fitted with accessories such as a hingedly mounted bridge member and adjustably mounted bow members. When positioned normal to the plane of the base member, the bridge member spaces the eyes of the viewer a predetermined distance from the base member and allows the viewer to hold the device with a minimum amount of instability. Bow members of the type used in spectacles, but having adjustable positions, are provided as an alternative to the standard handle member. An improved septum is provided by positioning base out prism lenses of the type formed from simple whole lenses such that the excess lensed aperture areas are eliminated and the need to frost or otherwise render opaque the nasal edges of the lenses is obviated.

5 Claims, 5 Drawing Figures

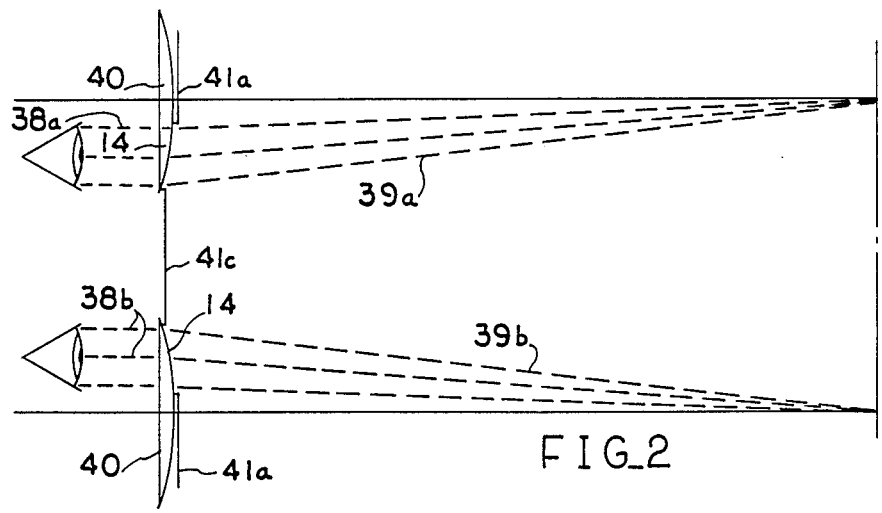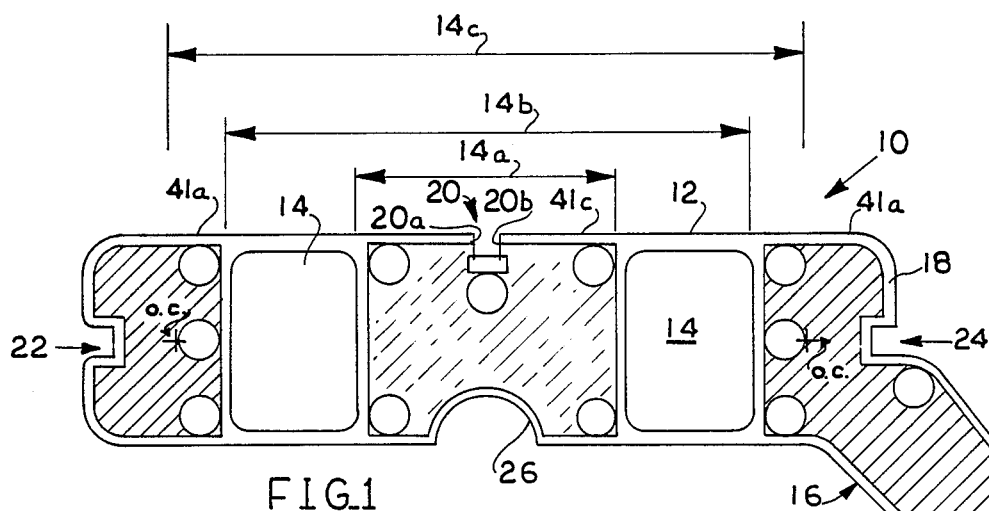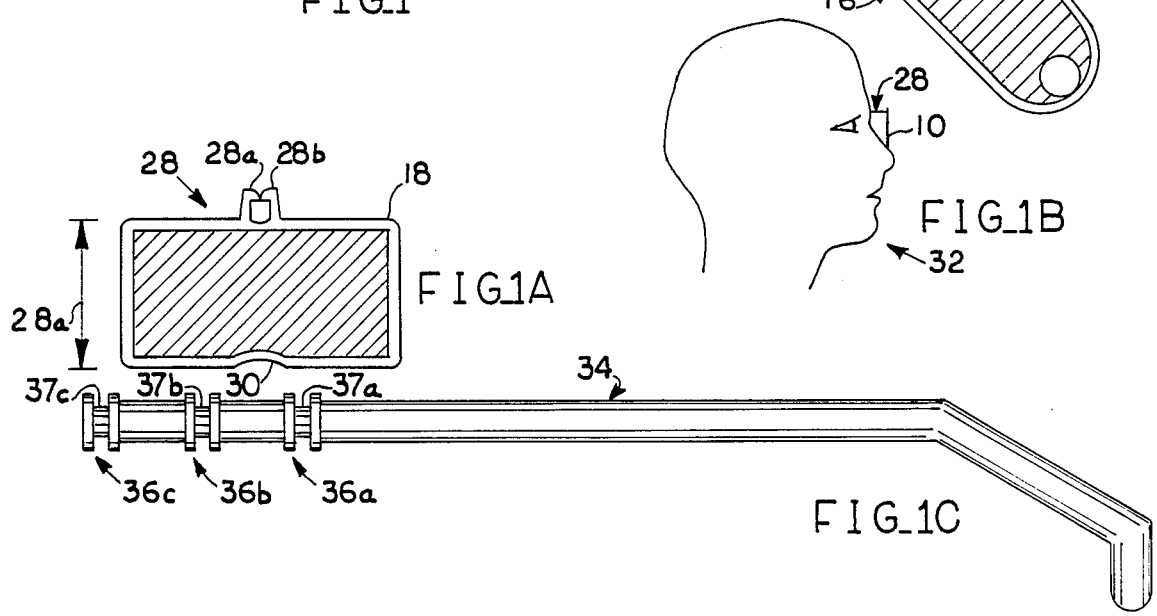

STEREOSCOPIC VIEWER OF THE LORGNETTE TYPE

BACKGROUND OF THE INVENTION

1. Field of the Invention

This invention relates, generally, to hand held stereoscopic viewers of the lorgnette type, and more specifically relates to such a viewer having accessory parts that enhance its performance.

2. Description of the Prior Art

Lorgnette stereo viewers are planar in configuration, hand held devices for viewing sterograms or stereographs. Typically, the handle takes the form of a handle member integral with the base plate which carries the lenses of the viewer.

A stereogram or a sterograph is formed by properly positioning two drawings or photographs of the same scene in a certain relation to one another; when properly positioned relative to one another, they form a "stereo pair."

Specifically, the same scene is photographed (as in a stereograph) or drawn or otherwise printed (as in a stereogram) from slightly different angles. Thus, the two views of the scene are homologous because they depict the same scene but are nevertheless different since the common scene is viewed at different angles. The two views are positioned side by side in a common plane, with a small space therebetween, to form the stereogram or stereograph.

Stereograms or stereographs (hereinafter referred to as stereograms for simplicity) must be viewed with a stereoscopic viewing device if the illusion of depth is to be provided to the viewer.

Stereoscopic viewing devices or stereoscopes are of course well known.

The stereoscope shown in U.S. Pat. No. to Petri, 2,849,917, awarded in 1958, is believed to represent the state of the art prior to the filing of the present disclosure.

Petri's device is of the lorgnette style. It has a number of features which advanced the state of the stereoscope art in 1958, but it includes a number of features which limit its utility.

For example, a viewer using the Petri device must have very stable hands. Most individual's hands tremble to some extent when trying to hold an object still, and the trembling usually increases when one is conscious of the fact that trembling is to be avoided, as when a stereogram is to be viewed.

Moreover, when viewing a stereogram, one must square the stereoscope and the stereogram, i.e., the stereogram and the stereoscope must be held in parallel planes.

The Petri device includes no means for stabilizing it, nor does it include any means that would assist the viewer in squaring the stereoscope with the stereogram.

In stereoscopes, a means must be provided to prevent the viewer's left eye from viewing the right member of the stereo pair, and vice versa. Devices which prevent an eye from seeing an image not intended to be viewed by it are called septums.

The septum commonly employed in the earliest stereoscopes was simply an opaque barrier wall that extended from the mid-point of the stereoscope base member to the stereogram or view card, said wall being positioned between the stereo pair of the stereogram and the lens members of the stereoscope.

Later stereoscopes, including Petri's, eliminated the barrier wall and provided the septum by frosting or otherwise rendering opaque the inner (nasal) edges of the lenses.

This technique prevents viewers with narrow interpupillary distances (I.P.D.s) from using the stereoscope; thus, a stereoscope built for viewers with wide I.P.D.s, such as adults, will have no utility for children.

Typically, a stereoscope will be designed for comfortable use by viewer's with very wide I.P.D.s, so that adults having wide-set eyes can use the same. Those adults having smaller I.P.D.s can still see the image if the view card is held further away from the stereoscope, but this merely aggravates the trembling hand problem.

Thus, there is a need for a stereoscope that will accommodate viewer's having a wide range of I.P.D.s.

It follows that there is need for an improved septum means so that the limitations of the masking septums of the prior art can be overcome.

There is also a need for a stereoscope having means enabling it to be held with a minimum of shaking.

Moreover, there is a need for a stereoscope having means which facilitate squaring the stereoscope and the view card.

Broadly speaking, there is a need for a stereoscope that can be provided with accessory parts so that stabilizing means, for example, can be added thereto if desired.

A stereoscope having all of the desireable features outlined herein does not appear in the prior art.

SUMMARY OF THE INVENTION

The present invention fulfills a very longstanding need for improvements in stereoscopes.

It provides a means that enables the stereoscope to be held with a minimum of trembling, and perhaps just as importantly, it provides such means in the form of an accessory so that it can be used as needed or not used.

It also provides an improved septum and completely eliminates the need for frosting or otherwise masking the nasal edges of the lenses carried by the stereoscope.

Moreover, it includes an additional accessory that allows the stereoscope to be worn in the same manner as eyeglasses, thereby freeing up the hand heretofore needed to hold the stereoscope.

The present invention even provides a means whereby the view card and the stereoscope can be placed into optimal alignment with one another.

The highly desireable features of the present invention are provided in the form of an integrally formed base member having a typical lorgnette-style co-planar handle extending therefrom.

The base member is provided with a mounting means formed in its upper edge and positioned mid-length thereof, i.e., between the lenses. A bridge member is hingedly secured to the base member by means of said mounting means.

Thus, the bridge member can be positioned in a plane normal to the plane of the base member, which position is its operative position, or it can be positioned in a plane parallel to the plane of the base member, which position is its stored position, or it can simply be removed from its hinged attachment to the base member if desired.

The bridge member serves several purposes.

When operatively deployed, the bridge member abuts the viewer's forehead at the base of the nose, thereby properly spacing the base member and hence the lenses a proper distance from the viewer's eyes.

The bridge member, since it is rested against the viewer's nose as aforesaid, thus reduces the shaking of the viewer's hand since the bridge member connects the stereoscope of the viewer's head and the head provides a base against which the stereoscope can rest. This contrasts sharply with the stereoscopes of the prior art which were devoid of any means whatsoever capable of providing a rest member against which the stereoscope could lean for stability purposes.

The novel stereoscope also positions the lens in a novel way that obviates the need to render the nasal edges of lens members opaque with frosting techniques.

Specifically, base out type prism lenses are positioned sufficiently far apart to completely eliminate the excess lensed aperture area of the prior art devices. The prior art devices, of which Petri is a good example, provided lensed aperture areas that were actually wider than necessary, so that a masking of the nasal edges thereof could then be applied to provide the needed septum.

These larger than necessary lenses were provided because they were formed of simple whole lenses; Petri's lenses are fragments of simple whole lenses, but the fragments are so large that frosting was still required as is clearly shown in the Petri drawings.

In sharp and distinctive contrast to the prior art technique of providing the needed septum, the present invention ingenuously provides lensed aperture areas that are only as large as is necessary. Thus, there is no need to frost or otherwise render opaque the nasal edges thereof.

Other features include removably mounted bow members which clip onto the edges of the base member to allow the stereoscope to be held in the same manner as ordinary spectacles.

It is the primary object of this invention to provide a broad advance in the art of stereoscopes.

A general by very important object is to provide the first stereoscope having accessory parts and means for attaching those accessory parts to the base member of the stereoscope.

A more specific object is to provide a stereoscope having a releasably and hingedly mounted bridge member that serves the dual purpose of properly positioning the stereoscope with respect to a viewer'e eyes and providing a stabilizing means to reduce the shaking of the stereoscope while it is being held.

Another important object is to eliminate the masking of the nasal edges of the lenses carried by the stereoscope by using lens members that are fragments of simple whole lenses and by ingenuously positioning the lens fragments.

Still another important object is to provide a stereoscope having a form that facilitates its alignment with the stereogram to be viewed.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is an elevational view of the novel stereoscope;

FIG. 1A is an elevational view of the novel bridge member;

FIG. 1B is a diagrammatic side view showing the operative positions of the novel stereoscope base member and bridge member;

FIG. 1C is an elevational view of one of the novel bow members; and

FIG. 2 is a schematic plan view of the novel stereoscope when operatively positioned relative to a stereogram.

DETAILED DESCRIPTION OF THE PREFERRED EMBODIMENT

Referring now to FIG. 1, it will there be seen that the novel stereoscope is designated by the reference numeral 10 as a whole.

Stereoscope 10 includes base member 12 which is generally rectangular in configuration, and base out prism lenses, collectively designated 14.

It is an important teaching of this invention that both base member 12 and lenses 12 are generally rectangular in configuration; the presence of straight lines in rectangular structures such as base member 12 and lenses 14 greatly facilitates the alignment of the stereoscope 10 and the view card. View cards are generally provided in rectangular form, and thus they are hard to align properly with stereoscopes having round or generally circular in configuration lenses and lense frames. An example of a difficult to align stereoscope, i.e., a stereoscope dominated by round lenses and round lines, is shown in the Petri patent, mentioned hereinabove.

Handle 16 is conventional to the extent that it is integral to base member 12; however, base member 12 and handle 16 are both unconventional to the extent that they are formed of a thin material and bordered by a thick border, denoted 18.

More specifically, the preferred materials for base member 12 and handle 16 are acrylic (transparent) plastics such as polycarbonate, polystyrene or methylmetacrylate. The thick, peripheral border 18 strengthens the stereoscope 10 and allows the portion of the stereoscope 10 surrounded by the border to be thin and thus light in weight and economical to manufacture.

A first notch means 20 is formed on the upper edge of base member 10 as illustrated in FIG. 1. Hinge pins 20a, 20b extend into the notch.

Second and third notch means 22 and 24 are formed on opposite sides of base member 10 as shown; said second and third notch means are not provided with hinge pins.

These notch means provide mounting means for attachment of items accessory to the stereoscope; a stereoscope having means for accepting accessory devices was heretofore unknown in the art.

A semicircular cut out portion or nose relief means 26 is formed on the bottom edge of the base member 12.

The distance between the nasal edges of the lenses 14 is preferably no more than one and three-quarter inches (1¾"); this distance is represented in FIG. 1 by the reference numeral 14a.

The distance between the outermost edges of lenses 14 is denoted 14b in FIG. 1; distance 14b is at least three and one-half inches (3½").

Since lenses 14 are of the base out prism type, being fragments of simple whole lenses as depicted in FIG. 2, the respective optical centers thereof lie laterally outwardly thereof. The distance denoted 14c in FIG. 1 represents the distance between the optical centers of the lenses 14; in the so-called "society" standard size, distance 14c is three and one-half inches (3½"). Distance 14c is four inches (4") if the size is the "general use" size, and distance 14c is four and one-half inches (4½") for "uncontrolled use."

The optical center of each lens 14 is indicated in FIG. 1 by a "±" sign and the notation "O.C."

Referring now to FIG. 1A, there it will be seen that the novel bridge member is denoted by the reference numeral 28 as a whole. It has a width dimension denoted by the reference numeral 28a.

It includes hinge arms 28a, 28b which pivotally engage hinge pins 20a, 20b of first notch means 20 (FIG. 1). Accordingly, bridge member 28, which is a flat piece, is hingedly mounted with respect to base member 12 when the novel stereoscope is in its assembled configuration.

Bridge member 28 includes a dished portion 30 on its bottom edge; dished portion 30 is adapted to receive the base of a viewer's nose as will be understood better in connection with FIG. 1B to which FIG. attention is now directed.

FIG. 1B shows a viewer 32 but the viewer's hands are not shown holding stereoscope 10 to simplify the drawing.

Bridge member 28 is shown in its operative, deployed position in FIG. 1B. It will therefore be understood that the width 28a of the bridge member determines the amount of spacing between the viewer's eyes and the stereoscope 10. It should also be clear from FIG. 1B that bridge member 28 not only provides a spacing means, heretofore unknown in stereoscope constructions, but it further stabilizes the stereoscope by rigidly connecting it to the viewer's head so that steady holding of the stereoscope is facilitated.

The abutting engagement of the nose relief cut away 26 formed in base member 12 and the viewer's nose is also best understood in connection with FIG. 1B, as is the abutting engagement between the base of the viewer's nose and the small cut away portion 30 formed in the bottom edge of the bridge member 28.

FIG. 1C shows a bow member 34 used with stereoscope 10; two of the bow members are employed and serve the same function as their corresponding parts in conventional spectacles.

However, bow members 34 are of novel construction as shown. Specifically, each bow member 34 includes a plurality of longitudinally spaced pairs of flanges, said pairs of flanges being designated 36a, 36b and 36c.

The spacing between each member of each pair of flanges, respectively denoted 37a, 37b and 37c is just slightly less than the thickness of base member 12. Thus, a preselected pair of flanges is press fit into notch means 22, 24 formed on the side of base member 12 to attach the bow member to said base member. The flanges serve to stabilize the attached bow member. A child would insert flanges 36a into the notch means, whereas progressively larger individuals would use flanges 36b or 36c.

In this manner, the need to hold handle 16 is eliminated and the stereoscope 10 can be worn as if it were a pair of eyeglasses. As long as bridge member 28 is deployed in a plane normal to the plane of the base member 12, as depicted in FIG. 1B, the lenses formed in the base member will be properly positioned relative to the viewer's eyes.

The novel means of eliminating the need to render the nasal edges of the respective lenses opaque is perhaps best understood in connection with FIG. 2.

The viewer's eyes are not numbered because they are diagramatically depicted; light rays, collectively designated 38a, 38b, are parallel to one another in the region between said eyes and the lenses 14 as is clearly depicted. Parallel, or columnar rays are referred to in the art as "collimated" rays.

However, light rays 39a and 39b are not collimated, due to the effect of lenses 14. Said rays converge on the optical centers in the well known manner.

An uncut simple whole lens 40 is shown in FIG. 2; the simple whole lens is not present in the novel device; the purpose of showing it to point out that the lenses 14 of the novel device are cut from such a simple whole lens.

FIG. 2 includes a pair of vertical lines 41a and 41b which represent opaque outer stops which prevent the light rays from entering the viewer's eyes; the same reference numerals appear in FIG. 1 and it will there be seen that the outer stops 41a and 41b are simply the translucent or opaque portions of the base member 12 lying laterally outwardly from the lenses 14.

A similar vertical line 41c appears in FIG. 2; it represents the novel septum or the inner stop which prevents the viewer's left eye from viewing the right member of the stereo pair and vice versa.

Line 41c thus represents the translucent portion of base member 12 between lenses 14 as is clear from an inspection of FIG. 1.

Thus, the inner and outer limits shown by vertical lines 41a, 41b and 41c in FIG. 2 are simply the translucent or opaque portions of the base member 12 itself; this positioning of lenses 14 and dimensioning of base member 12 thus eliminates entirely the prior art technique of frosting the lenses. Lenses 14 are totally transparent and no portion thereof is frosted or otherwise rendered opaque.

The provision of unfrosted lenses 14 clearly represent a major advance in the art of stereoscopes; it reduces the cost of manufacturing the lenses as well and enables the entire stereoscope 10 to be very economically manufactured.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:
1. A stereoscopic viewing device, comprising:
    a planar in configuration base member;
    a pair of laterally spaced lens members positioned in said base member;
    positioning means to position said base member and hence said lens members a predetermined proper distance from the eyes of a viewer using said device;

said positioning means provided in the form of a planar in configuration bridge member hingedly mounted to said base member;

said bridge member having an operative position and a stored position, said hinged mounting thereof being operative to allow said bridge member to be positioned in either of said positions;

said bridge member positioned normal to said base member when in its operative position;

said bridge member positioned parallel to said base member when in its stored position;

and said bridge member having a predetermined dimension so that when in its operative position normal to said base member, it maintains the eyes of a viewer using said device at a proper distance from said lens members.

2. The device of claim 1, wherein said bridge member is hingedly mounted to said base member substantially mid-length of an upper edge of said base member.

3. The device of claim 1, wherein said base member is generally rectangular in configuration and wherein said lens members are generally rectangular in configuration as well so that rectilinear lines in said base member and lens members facilitate proper squaring of said device and a scene being viewed.

4. The device of claim 1, further comprising a pair of elongate bow members releasably secured to said base member.

5. The device of claim 4, further comprising adjustment means associated with said bow members, said adjustment means comprising a plurality of spaced apart connecting means formed in each of said bow members, each of said connecting means operative to releasably engage said base member.

* * * * *